United States Patent [19]

Minami et al.

[11] Patent Number: 5,500,291
[45] Date of Patent: Mar. 19, 1996

[54] LITHIUM ION CONDUCTIVE SOLID ELECTROLYTE AND PROCESS FOR SYNTHESIZING THE SAME

[75] Inventors: Tsutomu Minami, Osakasayama; Masahiro Tatsumisago, Sakai; Kazunori Takada, Osaka; Shigeo Kondo, Hirakata, all of Japan

[73] Assignee: Matsushita Electric Industrial Co., Ltd., Osaka, Japan

[21] Appl. No.: 406,651

[22] Filed: Mar. 20, 1995

Related U.S. Application Data

[63] Continuation-in-part of Ser. No. 207,027, Mar. 7, 1994, abandoned.

[30] Foreign Application Priority Data

Mar. 22, 1993 [JP] Japan .................... 5-061639

[51] Int. Cl.$^6$ .................................. H01M 6/04
[52] U.S. Cl. ................ 429/206; 429/188; 429/191; 429/193; 429/207; 252/62.2; 252/500; 204/421
[58] Field of Search ............... 429/188, 191, 429/193, 199, 206, 207; 204/421; 252/62.2, 500

[56] References Cited

U.S. PATENT DOCUMENTS 4,585,714  4/1986  Akridge ............................ 429/193

FOREIGN PATENT DOCUMENTS

| 0206339A3 | 12/1986 | European Pat. Off. . |
| 0207242A3 | 1/1987 | European Pat. Off. . |
| 0469574A1 | 2/1992 | European Pat. Off. . |
| 2521125A1 | 8/1983 | France . |

*Primary Examiner*—Bruce F. Bell
*Attorney, Agent, or Firm*—Stevens, Davis, Miller & Mosher

[57] ABSTRACT

A sulfide-based lithium ion conductive solid electrolyte having a high ion conductivity and a high decomposition voltage contains crosslinking oxygen ions and silicon ions combined with the crosslinking oxygen ions in a structure of

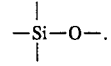

7 Claims, 2 Drawing Sheets

LITHIUM ION CONDUCTIVE SOLID ELECTROLYTE AND PROCESS FOR SYNTHESIZING THE SAME

This application is a continuation-in-part of application Ser. No. 08/207,027, filed Mar. 7, 1994 (abandoned).

BACKGROUND OF THE INVENTION

1. Field of the Invention

The present invention relates to a solid electrolyte for use in solid electrochemical elements including a solid cell, and more particularly to a lithium ion conductive solid electrolyte whose ion conductive species is lithium ion, and a process for synthesizing the same.

2. Related Art of the Invention

With recent development of portable appliances such as personal computers, portable telephones, etc., a demand for cells as their power source has been considerably increased. Particularly, lithium cells have been extensively studied in various fields as cells capable of giving a high energy density, because lithium is a substance having a small atomic weight and a large ionization energy.

On the other hand, the cells so far used in these fields are based substantially on a liquid electrolyte and thus it has been impossible to eliminate such problems as leakage of liquid electrolyte, etc. To solve these problems, thereby enhancing the reliability and also to make the elements smaller and thinner, attempts for replacing the liquid electrolyte with a solid electrolyte and making an entirely solid cell have been extensively made in various fields.

The above-mentioned lithium, when brought into an abnormal state, has a fear of ignition due to the high energy density. Thus, development of an entirely solid lithium cell using a solid electrolyte made from a non-combustible solid has been desired to ensure the safety of the cell. Lithium halide, lithium nitride, oxy acid salts of lithium, and their derivatives are known as solid electrolytes for use in such a cell. Lithium ion conductive sulfide-based amorphous solid electrolytes such as $Li_2S$—$SiS_2$, $Li_2S$—$P_2S_5$, $Li_2S$—$B_2S_3$, etc. are known as solid electrolytes having a particularly high ion conductivity such as more than $10^{-4}$ S/cm.

Ion conductivity of a solid electrolyte, when made into a cell, gives an influence on the internal impedance. For example, a solid cell made from a solid electrolyte having a high ion conductivity has a lower internal impedance than that from a solid electrolyte having a low ion conductivity, and thus can work (i.e. can be charged or discharged) with a larger quantity of electric current. Thus, attempts to increase the ion conductivity have been extensively made in various fields, and it was reported that the above-mentioned sulfide-based solid electrolyte had a high ion conductivity such as $1 \times 10^{-3}$ S/cm, when doped with LiI.

However, the sulfide-based solid electrolyte having an increased ion conductivity by doping with LiI still has the following problem. That is, decomposition voltage of LiI is about 2.7 V by thermodynamic calculation, and, thus, when a voltage of more than 2.7 V is applied to LiI, I ions are oxidized at the positive pole. Thus, it is difficult to make cells having a voltage of more than 2.7 V from the solid electrolyte doped with LiI. Dopant compounds other than lithium iodide to improve the ion conductivity generally include, for example, lithium halides such as lithium bromide, lithium chloride, etc., but the lithium halides undergo an oxidation reaction of halide ions, when used as a dopant, with the result that the resulting solid electrolyte has a lowered decomposition voltage.

U.S. Pat. No. 4,585,714 to Akridge relates to a quaternary vitreous lithium conductive electrolyte having a composition, aX, b$Li_2S$, Y, Z, where X is $P_2S_5$ or $SiS_2$; Y is $Li_4SiO_4$, $Li_2CO_3$ or $Li_2SiO_3$; Z is LiI, LiBr, LiCl or LiF. That is, the lithium ion conductor disclosed in the cited reference requires the presence of lithium halide as the essential component.

SUMMARY OF THE INVENTION

An object of the present invention is to provide a lithium ion conductive solid electrolyte having less decrease in the decomposition voltage and a higher ion conductivity, freed from the above-mentioned problem. The present invention provides a sulfide-based lithium ion conductive solid electrolyte containing crosslinking oxygen ions and silicon ions combined with the crosslinking oxygen ions and being free from halide ions as shown below:

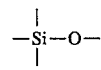

According to one aspect of the present invention, a sulfide-based lithium ion conductive electrolyte comprises a plurality of sulfides including silicon sulfide and lithium sulfide, and oxides or oxy acid salts containing at least one element selected from the group consisting of lithium, boron, phosphorus, aluminum, germanium and silicon.

According to another aspect of the present invention a sulfide-based lithium ion conductive solid electrolyte comprises at least one sulfide selected from the group consisting of silicon sulfide, boron sulfide, phosphorus sulfide, aluminum sulfide and germanium sulfide; lithium sulfide; and oxides or oxy acid salts containing silicon. Lithium orthosilicate is preferable as an oxy acid salt containing silicon.

The above-mentioned solid electrolyte is synthesized by melting a mixture of a plurality of sulfides including silicon sulfide and lithium sulfide and oxides or oxy acid salts containing at least one element selected from the group consisting of lithium, boron, phosphorus, aluminum, germanium and silicon, and then quenching the molten mixture.

Furthermore, the above-mentioned solid electrolyte is synthesized by melting a mixture of at least one sulfide selected from the group consisting of silicon sulfide, boron sulfide, phosphorus sulfide, aluminum sulfide and germanium sulfide and oxides or oxy acid salts containing silicon, and then quenching the molten mixture.

Functions of the present invention will be described below, referring to a case of $Li_2S$—$SiS_2$ admixed with lithium silicate.

Sulfide-based amorphous solid electrolyte comprises glass-forming ions that form a glass skeleton and mobile ions that transport electricity. In case of $Li_2S$—$SiS_2$ based amorphous solid electrolyte, tetrahedrons of $SiS_4^{4-}$ form the glass skeleton, through which $Li^+$ ions move. In case of $Li_2O$—$SiO_2$ as an oxide-based amorphous solid electrolyte where sulfur ions of $Li_2S$—$SiS_2$ are replaced with oxygen ions, tetrahedrons of $SiO_4^{4-}$ form a glass skeleton, through which $Li^+$ ions move.

Sulfide-based glass has a higher ion conductivity than that of oxide-based glass, because sulfur is an element having a higher polarizability than oxygen.

Researches have been made on the glass structure of sulfide-based amorphous solid electrolyte, and it has been clarified that there are two types of sulfur ions in the sulfide-based solid electrolyte. That is, one type is a crosslinking sulfur ion that form a glass structure of Si—S—Si, and the other is a non-crosslinking sulfur ion that is combined terminally with $Li^+$ ion in the form of Si—S $Li^+$, where $Li^+$ contributes to the ion conduction. In order to obtain a higher ion conductivity, it is necessary to increase the $Li^+$ concentration, that is, it is desirable to increase the concentration of non-crosslinking sulfur ions, but too many non-crosslinking sulfur ions make it difficult to form glass.

NMR, etc. clarified that 0, 2 or 4 crosslinking sulfur ions were combined with one silicon ion. Thus, it can be presumed that the sulfide-based solid electrolyte of $Li_2S$—$SiS_2$ system in the super ion conductive state contains silicon ions each combined with 2 crosslinking sulfur ions in a glass-formable range, while the other remaining silicon ions each are combined with 4 crosslinking sulfur ions. In $SiO_4^{4-}$, where 4 sulfur ions of $SiS_4^{4-}$ are replaced with 4 oxygen ions, 1 or 3 crosslinking oxygen ions can be combined with one silicon ion in addition to 0, 2 or 4 crosslinking ions on the other hand. Thus, when the sulfur ions in a sulfide-based solid electrolyte is partially replaced with oxygen ions, one of two crosslinking sulfur ions combined with one silicon ion can be replaced with one crosslinking oxygen ion, and the remaining crosslinking sulfur ion can take a mobile $Li^+$ ion as a non-crosslinking sulfur ion. That is, a glass having a high $Li^+$ ion concentration can be formed by partially replacing the sulfur ions of a sulfide based solid electrolyte with oxygen ions.

By partially replacing sulfur ions of a solid electrolyte of $Li_2S$—$SiS_2$ system with oxygen ions, thereby forming crosslinking oxygen ions, a glass having a high $Li^+$ ion concentration can be formed. Since substantially all of the glass skeleton takes the form of $SiS_4^{4-}$, $Li^+$ ions and the glass skeleton have no considerable mutual action on one another and thus the ion conductivity can be increased.

In the foregoing, the function of the present invention, i.e. an increase in the ion conductivity, has been described, referring to a solid electrolyte of $Li_2S$—$SiS_2$ system as one example, and other sulfide-based solid electrolytes such as $LiS_2$—$P_2S_5$, etc. can have likewise a higher ion conductivity by making solid electrolytes contain silicon ions combined with crosslinking oxygen ions. Since no such compounds having a low decomposition voltage as LiI are not used in the present invention, the decomposition voltage of solid electrolytes is not lowered.

In the present invention, a lithium ion conductive solid electrolyte having a high ion conductivity can be obtained by making a sulfide-based solid electrolyte contain crosslinking oxygen ions and free from halide ions without lowering the decomposition voltage.

The solid electrolyte containing silicon ions combined with the crosslinking oxygen ions is a lithium ion conductive solid electrolyte synthesized from a plurality of sulfides including silicon sulfide and lithium sulfide and an oxide or oxy acid salt containing at least one element selected from the group consisting of lithium, boron, phosphorus, aluminum, germanium and silicon.

Furthermore, the solid electrolyte containing silicon ions combined with the crosslinking oxygen ions is a lithium ion conductive solid electrolyte synthesized from at least one sulfide selected from the group consisting of silicon sulfide, boron sulfide, phosphorus sulfide, aluminum sulfide and germanium sulfide; lithium sulfide;.and oxides or oxy acid salts containing silicon.

To obtain a sulfide-based solid electrolyte containing silicon ions combined with crosslinking oxygen ions, lithium silicate must be added to the sulfide-based solid electrolyte. That is, the sulfide-based solid electrolyte containing crosslinking oxygen ions can be a solid electrolyte synthesized from at least one sulfide selected from the group consisting of silicon sulfide, boron sulfide, phosphorus sulfide, aluminum sulfide and germanium sulfide; lithium sulfide; and lithium silicate.

Since the ion conductivity of these solid electrolytes is proportional to a concentration of mobile ions, an oxide or oxy acid salt containing more lithium ions is preferable. Lithium orthosilicate contains silicon as a constituent element and contains more lithium ions than lithium metasilicate, etc., and thus contributes to a higher ion conductivity of the resulting solid electrolyte. Thus, lithium orthosilicate is more preferably used in the present invention.

The above-mentioned solid electrolyte can be synthesized by melting a mixture of a plurality of sulfides including silicon sulfide and lithium sulfide and oxides or oxy acid salts containing at least one element selected from the group consisting of lithium, boron, phosphorus, aluminum, germanium and silicon, and then quenching the molten mixture.

Furthermore, the above-mentioned solid electrolyte can be synthesized by melting a mixture of at least one sulfide selected from the group consisting of silicon sulfide, boron sulfide, phosphorus sulfide, aluminum sulfide and germanium sulfide; lithium sulfide; and oxides or oxy acid salts containing silicon, and then quenching the molten mixture.

PREFERRED EMBODIMENTS OF THE INVENTION

The present invention will be described in detail below, referring to Examples and Drawings, where all the operations were carried out in a dry box filled with an inert gas.

EXAMPLE 1

In this example, a solid electrolyte represented by $xLi_4SiO_4$-$(1-x)[0.6Li_2S$-$0.4SiS_2]$ was synthesized, using lithium orthosilicate as a lithium silicate and its characteristics were evaluated. Its detail will be given below:

At first, lithium orthosilicate, and lithium sulfide and lithium silicate were mixed in a molar ratio of $x:0.6(1-x):0.4(1-x)$, and then the mixture was placed in a glassy carbon crucible, heated at 950° C. in an Ar gas stream and melted. Then, the melt was quenched through a twin roller to synthesize a ribbon-shaped solid electrolyte represented by $xLi_4SiO_4$-$(1-x)[0.6Li_2S$-$0.4SiS_2]$.

Figure 1:
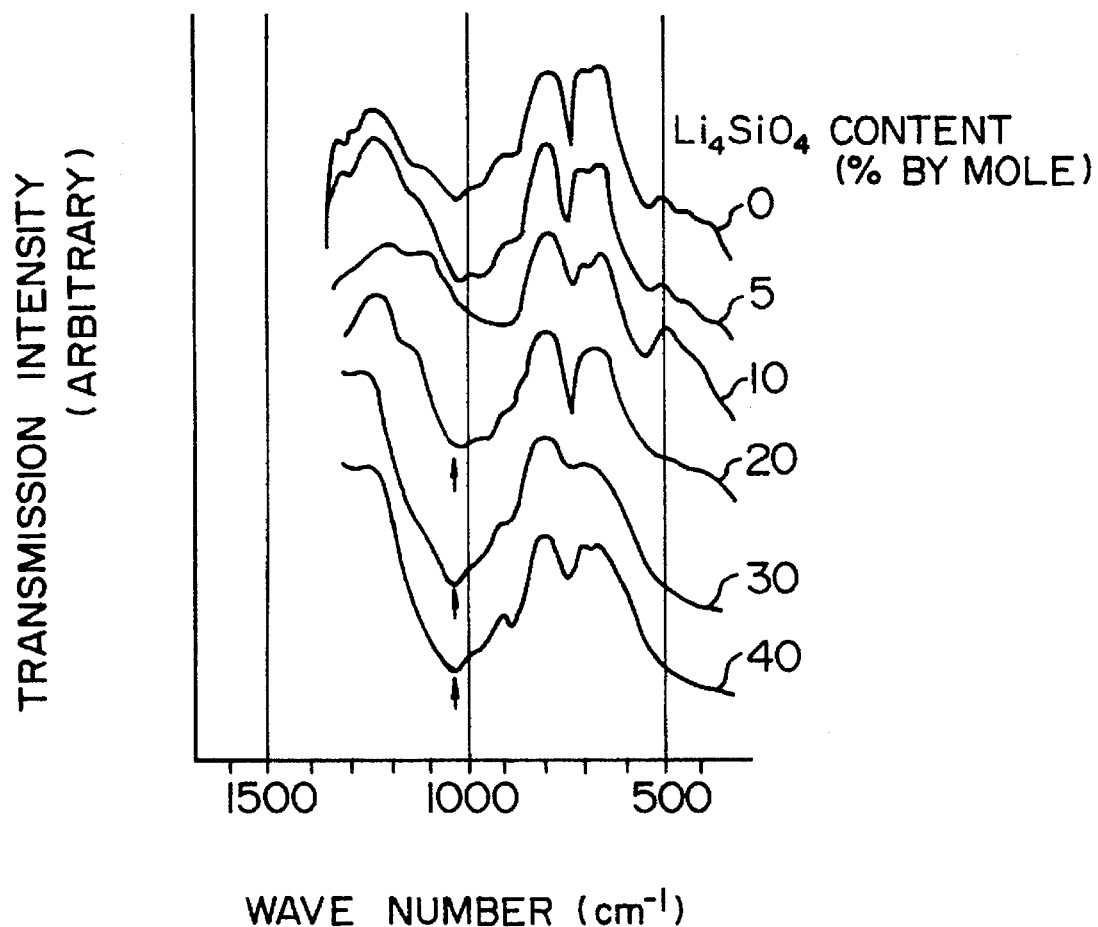
FIG. 1 shows infrared absorption spectra of solid electrolyte according to one embodiment of the present invention.

The structure of the thus obtained solid electrolyte was investigated by its infrared spectroscopy, and it was found that with increasing lithium silicate content absorption spectra due to the crosslinking oxygen ions combined with silicon ions were more clearly observed, as shown in FIG. 1, and that the resulting solid electrolytes contained crosslinking oxygen ions and silicon ions combined with the crosslinking oxygen ions.

Figure 2:
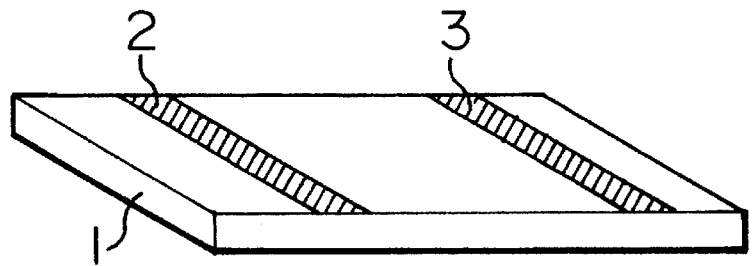
FIG. 2 is a schematic view of a cell for measuring ion conductivity of solid electrolytes according to one embodiment of the present invention.

To measure an ion conductivity of the thus obtained solid electrolytes, Au electrodes 2 and 3 were formed on the surface of the ribbon-shaped solid electrolyte 1 by sputtering, as shown in FIG. 2. With the thus formed cell, the ion conductivity of the solid electrolyte was measured according to a complex impedance method. A decomposition voltage of the solid electrolyte was measured with the above-mentioned cell according to a DC polarization method.

Figure 3:
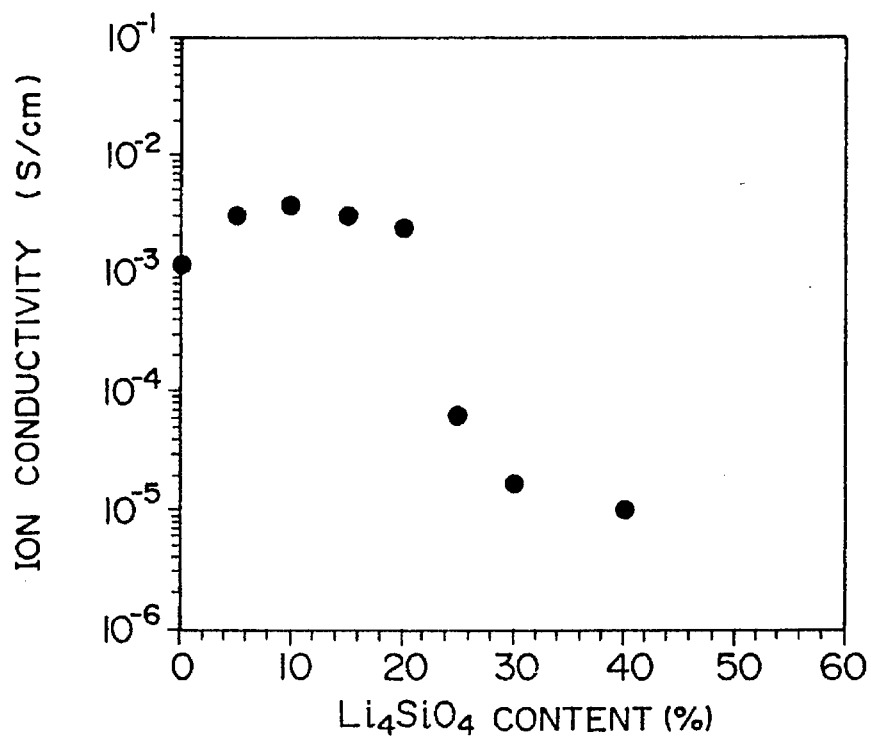
FIG. 3 is a diagram showing a correlation between the lithium orthosilicate content and ion conductivity of solid electrolytes according to one embodiment of the present invention.

Correlation between the ion conductivity and the $Li_4SiO_4$ content of the thus obtained solid electrolyte at room temperature is shown in FIG. 3. The ion conductivity of the solid electrolyte was increased by increasing a content of $Li_4SiO_4$ to be added to $0.6Li_2S$-$0.4SiS_2$, and was as high as $3.5 \times 10^{-3}$ S/cm at a composition of $0.10Li_4SiO_4$-$0.54Li_2S$-$0.36SiS_2$ at room temperature.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V.

Thus, solid electrolytes having a high ion conductivity could be obtained in this Example without lowering the decomposition voltage.

EXAMPLE 2

In this Example, a solid electrolyte was synthesized by a quenching method using liquid nitrogen in place of the quenching method using the twin roller method of Example 1, and its characteristics were evaluated.

At first, a glass matrix of $Li_2S$—$SiS_2$ system to be doped with lithium orthosilicate was synthesized in the following manner:

Lithium sulfide ($Li_2S$) and silicon sulfide ($SiS_2$) were mixed in a molar ratio of 6:4, and the resulting mixture was placed in a glassy carbon crucible. Then, the crucible was placed in a vertical type furnace and heated in an Ar gas stream up to 950° C. to melt the mixture. After the heating for 2 hours, the crucible was dropped into liquid nitrogen and quenched, whereby a glass matrix represented by $0.6Li_2S$-$0.4SiS_2$ was synthesized.

Then, the glass matrix was pulverized and mixed with lithium orthosilicate, and the mixture was melted and quenched in the same manner as above.

The structure of the thus obtained solid electrolyte was investigated by the same infrared absorption spectroscopy as in Example 1, and it was found that the solid electrolyte contained crosslinking oxygen ions combined with silicon ions.

Ion conductivity and decomposition voltage of the solid electrolyte were evaluated in the following manner as characteristics of the solid electrolyte.

At first, the thus obtained solid electrolyte was pulverized and 200 mg of the resulting powder was weighed out and press molded into a disk, 10 mm in diameter. Pt plates were provided as measuring electrodes on both sides of the disk, and then the entire disk was pressed. Lead terminals were bonded to the Pt plates by a carbon paste to make a measuring cell.

With the thus formed measuring cell, an ion conductivity of the solid electrolyte was measured by the same complex impedance method as in Example 1.

A decomposition voltage of the solid electrolyte was measured with the cell according to the same DC polarization method as in Example 1.

Figure 4:
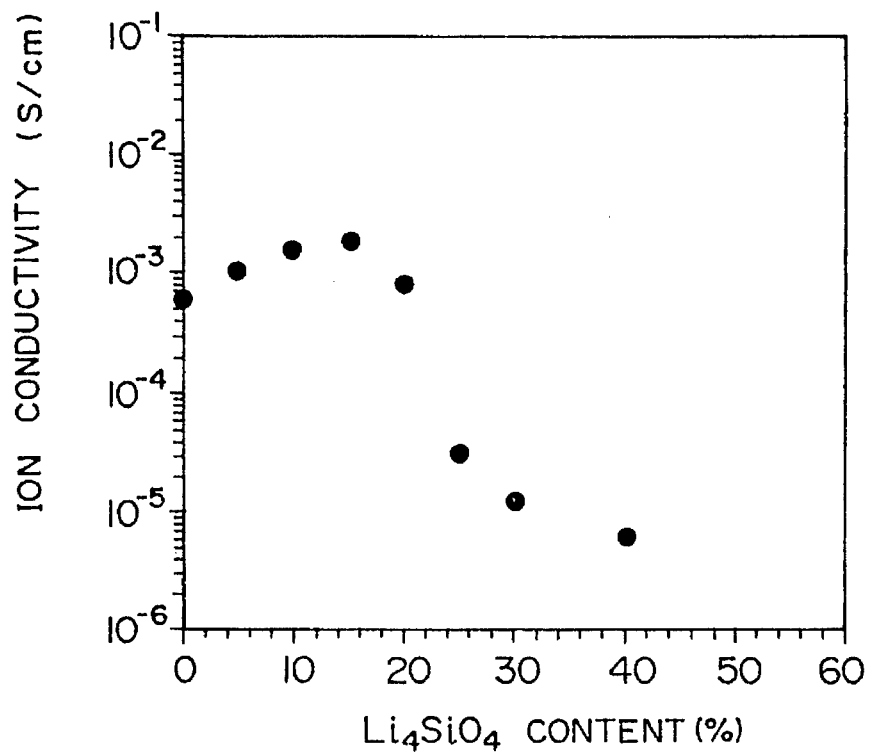
FIG. 4 is a diagram showing a correlation between the lithium orthosilicate content and ion conductivity of solid electrolytes according to another embodiment of the present invention.

Correlation between the ion conductivity and $Li_4SiO_4$ content of the solid electrolyte at room temperature is shown in FIG. 4. It was found that the ion conductivity of the solid electrolyte was increased with increasing amount of $Li_4SiO_4$ to be added to $0.6Li_2S$-$0.4SiS_2$ and reached a maximum at a composition of $0.15Li_4SiO_4$-$0.5Li_2S$-$0.35SiS_2$ at room temperature.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 3

In this Example, a lithium ion conductive solid electrolyte represented by $xLi_4SiO_4$-$(1-x)[0.65Li_2S$-$0.35SiS_2]$ was synthesized in the same manner as in Example 2, except that a glass matrix represented by $0.65Li_2S$-$0.35SiS_2$ as a glass matrix of $Li_2S$-$SiS_2$ system to be doped with lithium orthosilicate in place of $0.6Li_2S$-$0.4SiS_2$ of Example 1, and its characteristics were evaluated. Its detail will be given below:

A glass matrix represented by $0.65Li_2S$-$0.35SiS_2$ was synthesized in the same manner as in Example 2 except that a mixture of lithium sulfide and silicon sulfide in a molar ratio of 65:35 was used as a starting material.

The thus obtained glass matrix was mixed with lithium orthosilicate and the resulting mixture was melted and quenched in the same manner as in Example 2, thereby synthesizing a lithium ion conductive solid electrolyte represented by $xLi_4SiO_4$-$(1-x)[0.65Li_2S$-$0.35SiS_2]$.

The structure of the thus obtained solid electrolyte was determined by the same infrared absorption spectroscopy as in Example 1, and it was found that the solid electrolyte contained crosslinking oxygen ions combined with silicon ions.

Ion conductivity and decomposition voltage of the solid electrolyte were measured in the same manner as in Example 2, and it was found that the ion conductivity of the solid electrolyte was increased with increasing amount of $Li_4SiO_4$ to be added to $0.65Li_2S$-$0.35SiS_2$ and reached a maximum at a composition of $0.15Li_4SiO_4$-$0.55Li_2S$-$0.30SiS_2$ at room temperature almost as in Example 2.

To determine the decomposition voltage of the solid electrolyte, the cell was subjected to DC polarization up to 5.0 V and it was found that there was no current passage due to the decomposition of the electrolyte and the solid electrolyte had a decomposition voltage of more than 5.0 V as in Example 1.

Thus, solid electrolytes having a high ion conductivity could be obtained in this Example without lowering the decomposition voltage.

EXAMPLE 4

A lithium ion conductive solid electrolyte represented by $xLi_4SiO_4\text{-}(1\text{-}x)[0.7Li_2S\text{-}0.3SiS_2]$ was synthesized in the same manner as in Example 1, using a glass matrix represented by $0.7Li_2S\text{-}0.3SiS_2$ as a glass matrix of $Li_2S\text{---}SiS_2$ system to be doped with lithium orthosilicate in place of $0.6Li_2S\text{-}0.4SiS_2$ of Example 1 and using the same quenching method as in Example 1, and its characteristics were evaluated. Its detail will be given below:

Lithium orthosilicate, lithium sulfide and silicon sulfide were mixed in a molar ratio of $x:0.7(1\text{-}x):0.3(1\text{-}x)$, and the resulting mixture was placed in a glassy carbon crucible. The crucible was placed in a vertical type furnace and heated in an argon gas stream up to 950° C. to melt the mixture. After the heating for 2 hours, the melt was passed through a twin roller to obtain a ribbon-shaped lithium ion conductive solid electrolyte represented by $xLi_4SiO_4\text{-}(1\text{-}x)[0.7Li_2S\text{-}0.3SiS_2]$.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was increased by adding $Li_4SiO_4$ to $0.7Li_2S\text{-}0.3SiS_2$ and was almost the same maximum as in Example 1 at a composition of $0.15Li_4SiO_4\text{-}0.59Li_2S\text{-}0.26SiS_2$ at room temperature.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 5

In this Example, a lithium ion conductive solid electrolyte represented by $xLi_2SiO_3\text{-}(1\text{-}x)[0.6Li_2S\text{-}0.4SiS_2]$ was synthesized in the same manner as in Example 1, using lithium metasilicate ($Li_2SiO_3$) in place of lithium orthosilicate of Example 1 and using the same twin roller method as in Example 1 as a quenching method, and its characteristics were evaluated. Its detail will be given below:

A ribbon-shaped lithium ion conductive solid electrolyte represented by $xLi_2SiO_3\text{-}(1\text{-}x)[0.6Li_2S\text{-}0.4SiS_2]$ was synthesized by melting and quenching in the same manner as in Example 1, except that lithium metasilicate was used in place of lithium orthosilicate.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $1.5 \times 10^{-3}$ S/cm as a maximum, which was lower than that of Example 1, but could be improved by adding lithium metasilicate to $0.6Li_2S\text{-}0.4SiS_2$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 6

In this Example, a lithium ion conductive solid electrolyte was synthesized in the same manner as in Example 1, using lithium oxide ($Li_2O$) as an oxide of lithium in place of lithium orthosilicate of Example 1 and using the same twin roller method as in Example 1 as a quenching method, and its characteristics were evaluated. Its detail will be given below:

A ribbon-shaped lithium ion conductive solid electrolyte was synthesized by melting and quenching in the same manner as in Example 1, except that lithium oxide was used in place of lithium orthosilicate.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $1.3 \times 10^{-3}$ S/cm as a maximum and could be improved by adding lithium oxide to $0.6Li_2S\text{-}0.4SiS_2$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 7

In this Example, a lithium ion conductive solid electrolyte was synthesized in the same manner as in Example 1, using lithium carbonate ($Li_2CO_3$) as an oxy acid salt of lithium in place of lithium orthosilicate of Example 1 and using the same twin roller method as in Example 1 as a quenching method, and its characteristics were evaluated. Its detail will be given below:

A ribbon-shaped lithium ion conductive solid electrolyte was synthesized by melting and quenching in the same manner as in Example 1, except that lithium carbonate was used in place of lithium orthosilicate.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $1.8 \times 10^{-3}$ S/cm at a composition of $0.05Li_2CO_3$-$0.57Li_2S$-$0.38SiS_2$, and could be improved by adding lithium carbonate to $0.6Li_2S$-$0.4SiS_2$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 8

In this Example, a lithium ion conductive solid electrolyte was synthesized in the same manner as in Example 1, using silicon oxide ($SiO_2$) as an oxide of silicon in place of lithium orthosilicate of Example 1 and using the same twin roller method as in Example 1 as a quenching method, and its characteristics were evaluated. Its detail will be given below:

A ribbon-shaped lithium ion conductive solid electrolyte was synthesized by melting and quenching in the same manner as in Example 1, except that silicon oxide was used in place of lithium orthosilicate.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $1.4 \times 10^{-3}$ S/cm at a composition of $0.02SiO_2$-$0.59Li_2S$-$0.39SiS_2$ and could be improved by adding silicon oxide to $0.6Li_2S$-$0.4SiS_2$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 9

In this Example, a lithium ion conductive solid electrolyte was synthesized in the same manner as in Example 1, using boron oxide ($B_2O_3$) as an oxide of boron in place of lithium orthosilicate of Example 1 and using the same twin roller method as in Example 1 as a quenching method, and its characteristics were evaluated. Its detail will be given below:

A ribbon-shaped lithium ion conductive solid electrolyte was synthesized by melting and quenching in the same manner as in Example 1, except that boron oxide was used in place of lithium orthosilicate.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $1.4 \times 10^{-3}$ S/cm at a composition of $0.04B_2O_3$-$0.58Li_2S$-$0.38SiS_2$ and could be improved by adding boron oxide to $0.6Li_2S$-$0.4SiS_2$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 10

In this Example, a lithium ion conductive solid electrolyte was synthesized in the same manner as in Example 1, using germanium oxide ($GeO_2$) as an oxide of germanium in place of lithium orthosilicate of Example 1 and using the same twin roller method as in Example 1 as a quenching method, and its characteristics were evaluated. Its detail will be given below:

A ribbon-shaped lithium ion conductive solid electrolyte was synthesized by melting and quenching in the same manner as in Example 1, except that germanium oxide was used in place of lithium orthosilicate.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $1.6 \times 10^{-3}$ S/cm at a composition of $0.06GeO_2$-$0.56Li_2S$-$0.38SiS_2$ and could be improved by adding germanium oxide to $0.6Li_2S$-$0.4SiS_2$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 11

In this Example, a lithium ion conductive solid electrolyte was synthesized in the same manner as in Example 1, using diphosphorus pentaoxide ($P_2O_5$) as an oxide of phosphorus in place of lithium orthosilicate of Example 1 and using the same twin roller method as in Example 1 as a quenching method, and its characteristics were evaluated. Its detail will be given below:

A ribbon-shaped lithium ion conductive solid electrolyte was synthesized by melting and quenching in the same manner as in Example 1, except that diphosphorus pentaoxide was used in place of lithium orthosilicate.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $1.8 \times 10^{-3}$ S/cm at a composition of $0.05P_2O_5\text{-}0.57Li_2S\text{-}0.38SiS_2$ and could be improved by adding diphosphorus pentaoxide to $0.6Li_2S\text{-}0.4SiS_2$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 12

In this Example, a lithium ion conductive solid electrolyte was synthesized in the same manner as in Example 1, using lithium aluminate ($LiAlO_2$) as an oxy acid salt of aluminum in place of lithium orthosilicate of Example 1 and using the same twin roller method as in Example 1 as a quenching method, and its characteristics were evaluated. Its detail will be given below:

A ribbon-shaped lithium ion conductive solid electrolyte was synthesized by melting and quenching in the same manner as in Example 1, except that lithium aluminate was used in place of lithium orthosilicate.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte could be improved by adding lithium aluminate to $0.6Li_2S\text{-}0.4SiS_2$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 13

A lithium ion conductive solid electrolyte represented by $xLi_4SiO_4\text{-}(1-x)[0.6Li_2S\text{-}0.4P_2S_5]$ was synthesized in almost the same manner as in Example 1, using a glass matrix represented by $0.6Li_2S\text{-}0.4P_2S_5$ in place of $0.6Li_2S\text{-}0.4SiS_2$ of Example 1 as a glass matrix to be doped with lithium orthosilicate and using the same twin roller method as a quenching method as in Example 1, and its characteristics were evaluated. Its detail will be given below:

A ribbon-shaped lithium ion conductive solid electrolyte represented by $xLi_2SiO_4\text{-}(1-x)[0.6Li_2S\text{-}0.4P_2S_5]$ was synthesized by melting and quenching in the same manner as in Example 1, except that phosphorus sulfide was used in place of silicon sulfide of the glass matrix.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $8.1 \times 10^{-4}$ S/cm at a composition of $0.10Li_4SiO_4\text{-}0.54Li_2S\text{-}0.36P_2S_5$ and could be improved by adding lithium orthosilicate to $0.6Li_2S\text{-}0.4P_2S_5$.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 14

A lithium ion conductive solid electrolyte represented by $xSiO_2\text{-}(1-x)[0.6Li_2S\text{-}0.4P_2S_5]$ was synthesized in almost the same manner as in Example 1, using a glass matrix represented by $0.6Li_2S\text{-}0.4P_2S_5$ in place of $0.6Li_2S\text{-}0.4SiS_2$ of Example 1 as a glass matrix to be doped with silicon oxide as an oxide of silicate in place of lithium orthosilicate of Example 1 and using the same twin roller method as a quenching method as in Example 1, and its characteristics were evaluated. Its detail will be given below:

A ribbon-shaped lithium ion conductive solid electrolyte represented by $xSiO_2\text{-}(1-x)[0.6Li_2S\text{-}0.4P_2S_5]$ was synthesized by melting and quenching in almost the same manner as in Example 1, except that silicon oxide was used in place of lithium orthosilicate and phosphorus sulfide was used in place of silicon sulfide.

The structure of the thus obtained solid electrolyte was determined by the same infrared adsorption spectroscopy in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $6.7 \times 10^{-4}$ S/cm at a composition of $0.05SiO_2\text{-}0.57Li_2S\text{-}0.38P_2S_5$ and could be improved by doping with silicon oxide.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 15

A lithium ion conductive solid electrolyte represented by $xLi_4SiO_4\text{-}(1-x)[0.6Li_2S\text{-}0.4B_2S_3]$ was synthesized in almost the same manner as in Example 1, using a glass matrix represented by $0.6Li_2S\text{-}0.4B_2S_3$ in place of $0.6Li_2S\text{-}0.4SiS_2$ of Example 1 as a glass matrix to be doped with lithium orthosilicate and using the same twin roller method as a quenching method as in Example 1, and its characteristics were evaluated. Its detail will be given below:

A ribbon-shaped lithium ion conductive solid electrolyte represented by $xLi_4SiO_4$-$(1-x)[0.6Li_2S$-$0.4B_2S_3]$ was synthesized by melting and quenching in almost the same manner as in Example 1, except that boron sulfide was used in the glass matrix in place of silicon sulfide.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $7.6 \times 10^{-4}$ S/cm at a composition of $0.12Li_4SiO_4$-$0.52Li_2S$-$0.36B_2S_3$ and could be improved by doping the glass matrix with lithium orthosilicate.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 16

A lithium ion conductive solid electrolyte represented by $xLi_4SiO_4$-$(1-x)[0.5Li_2S$-$0.5GeS_2]$ was synthesized in almost the same manner as in Example 1, using a glass matrix represented by $0.5Li_2S$-$0.5GeS_2$ as a glass matrix to be doped with lithium orthosilicate in place of $0.6Li_2S$-$0.4SiS_2$ of Example 1 and using the same twin roller method as a quenching method as in Example 1, and its characteristics were evaluated. Its detail will be given below:

A ribbon-shaped lithium ion conductive solid electrolyte represented by $xLi_4SiO_4$-$(1-x)[0.5Li_2S$-$0.5GeS_2]$ was synthesized by melting and quenching in almost the same manner as in Example 1, except that germanium sulfide was used in the glass matrix in place of silicon sulfide.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $3.4 \times 10^{-4}$ S/cm at a composition of $0.04Li_4SiO_4$-$0.48Li_2S$-$0.48GeS_2$ and could be improved by doping the glass matrix with lithium orthosilicate.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

EXAMPLE 17

A lithium ion conductive solid electrolyte represented by $xLi_4SiO_4$-$(1-x)[0.5Li_2S$-$0.5Al_2S_3]$ was synthesized in almost the same manner as in Example 1, using a glass matrix represented by $0.5Li_2S$-$0.5Al_2S_3$ as a glass matrix to be doped with lithium orthosilicate in place of $0.6Li_2S$-$0.4SiS_2$ of Example 1 and using the same twin roller method as a quenching method as in Example 1, and its characteristics were evaluated. Its detail will be given below:

A ribbon-shaped lithium ion conductive solid electrolyte represented by $xLi_4SiO_4$-$(1-x)[0.5Li_2S$-$0.5Al_2S_3]$ was synthesized by melting and quenching in almost the same manner as in Example 1, except that aluminum sulfide was used in place of silicon sulfide.

The structure of the thus obtained solid electrolyte was determined by the same infrared adsorption spectroscopy as in Example 1, and it was found that the solid electrolyte contained crosslinking oxygen ions combined with silicon ions.

Ion conductivity and decomposition voltage of the solid electrolyte were measured in the same manner as in Example 1, and it was found that the ion conductivity of the solid electrolyte was $7.3 \times 10^{-4}$ S/cm at a composition of $0.06Li_4SiO_4$-$0.47Li_2S$-$0.47Al_2S_3$ and could be improved by doping the glass matrix with lithium orthosilicate.

To determine a decomposition voltage of the solid electrolyte, the cell was subjected to DC polarization up to a voltage of 5 V, and it was found that there was no current passage due to the decomposition of the solid electrolyte and thus the present solid electrolyte had a decomposition voltage of more than 5.0 V, as in Example 1.

Thus, solid electrolytes having a high ion conductivity could be obtained in this Example without lowering the decomposition voltage.

Comparative Example 1

To investigate influences of the presence of halide ions in a solid electrolyte for comparison, a solid electrolyte containing iodide ions as halide ions was synthesized by adding lithium iodide to $0.10Li_4SiO_4$-$0.54Li_2S$-$0.36SiS_2$ having the highest ion conductivity in Example 1, and its characteristics were evaluated.

That is, a solid electrolyte represented by $0.10Li_4SiO_4$-$0.54Li_2S$-$0.36SiS_2$ obtained in Example 1 and lithium iodide were mixed together in a molar ratio of the former to the latter of 0.3:0.7 as starting materials and melted by heating in the same manner as in Example 1, followed by quenching through a twin roller.

Ion conductivity of thus obtained solid electrolyte was measured in the same manner as in Example 1 and found to be $3.8 \times 10^{-}$S/cm.

Then, decomposition voltage of the solid electrolyte was measured by the same DC polarization method as in Example 1. Oxidation current which seemed to be due to the decomposition of the solid electrolyte was observed at least at about 3.5 V.

Thus, it was found that the solid electrolyte containing iodide ions had a lower decomposition voltage due to the presence of iodide ions.

Comparative Example 2

For comparison, a solid electrolyte containing bromide ions as halide ions was synthesized to evaluate its characteristics.

That is, a solid electrolyte containing bromide ions was synthesized in the same manner as in Comparative Example 1 except lithium bromide was used in place of lithium iodide.

The resulting solid electrolyte has an ion conductivity of $3.6 \times 10^{-3}$ S/cm, but oxidation current was observed at least at about 3.5 V by the DC polarization method, as in Comparative Example 1.

It was found that the solid electrolyte containing bromide ions had a lower decomposition voltage due to the presence of bromide ions.

In the foregoing, description of methods for forming crosslinking oxygen ions has been made only on the methods by addition of oxides or oxy acid salts, but other methods for forming crosslinking oxygen ions, for example, by addition of other additives such as an oxy acid or by melting of a raw material including silicon sulfide by heating in an oxygen-containing atmosphere, are also effective. Thus, the present invention is not limited to the methods for forming crosslinking oxygen ions given in the foregoing Examples.

In the foregoing Examples, description has been made only on such solid electrolytes as $xLi_4SiO_4$-$(1-x)[0.6Li_2S$-$0.4SiS_2]$, $xLi_4SiO_4$-$(1-x)[0.65Li_2S$-$0.35SiS_2]$, $xLi_4SiO_4$-$(1-x)[0.7Li_2S$-$0.35SiS_2]$, $xLi_2SiO_3$-$(1-x)[0.6Li_2S$-$0.4SiS_2]$, $xLi_2SiO_3$-$(1-x)[0.6Li_2S$-$0.4SiS_2]$, $xLi_2SiO_3$-$(1-x)[0.6Li_2S$-$0.4P_2S_5]$, $xLi_4SiO_4$-$(1-x)[0.6Li_2S$-$0.4B_2S_3]$, etc., but other solid electrolytes having different composition ratios such as $xLi_4SiO_4$-$(1-x)[0.5Li_2S$-$0.5SiS_2]$, etc., and pseudo quaternary solid electrolytes such as $Li_4SiO_4$—$Li_2S$—$SiS_2$—$P_2S_5$, etc. or higher multi-component solid electrolytes are also effective. The present invention is not limited to the solid electrolytes given in the foregoing Examples.

In the foregoing Examples, description has been made on the twin roller method and quenching in liquid nitrogen as quenching methods, but other quenching methods such as an iron press method, etc. are also effective. Thus, the present invention is not limited only to the quenching methods given in the foregoing Examples.

As described above, a sulfide-based lithium conductive solid electrolyte so synthesized as to contain crosslinking oxygen ions and silicon ions combined with the crosslinking oxygen ions being free from halide ions can have a high ion conductivity and a high decomposition voltage.

By using lithium orthosilicate as an oxy acid salt containing silicon, a solid electrolyte having particularly high ion conductivity and high decomposition voltage can be obtained.

A lithium ion conductive solid electrolyte having a high ion conductivity and a high decomposition voltage can be synthesized by melting a mixture of a plurality of sulfides including silicon sulfide and lithium sulfide and oxides or oxy acid salts containing at least one element selected from the group consisting of lithium, boron, phosphorus, aluminum, germanium and silicon, and then quenching the molten mixture, or melting a mixture of at least one sulfide selected from the group consisting of silicon sulfide, boron sulfide, phosphorus sulfide, aluminum sulfide and germanium sulfide; lithium sulfide; and oxides or oxy acid salts containing silicon, and then quenching the molten mixture.

What is claimed is:

1. A lithium ion conductive solid electrolyte, which comprises a sulfide-based lithium ion conductive solid electrolyte containing crosslinking oxygen ions and silicon ions combined with the crosslinking oxygen ions and being free from halide ions.

2. A lithium ion conductive solid electrolyte according to claim 1, wherein the sulfide-based lithium ion conductive solid electrolyte is synthesized from a plurality of sulfides including silicon sulfide and lithium sulfide and oxides or oxy acid salts containing at least one element selected from the group consisting of lithium, boron, phosphorus, aluminum and germanium.

3. A lithium ion conductive solid electrolyte according to claim 2, wherein the oxy acid salt containing silicon is lithium orthosilicate.

4. A lithium ion conductive solid electrolyte according to claim 1, wherein the sulfide-based lithium ion conductive solid electrolyte is synthesized from at least one sulfide selected from the group consisting of silicon sulfide, boron sulfide, phosphorus sulfide, aluminum sulfide and germanium sulfide; lithium sulfide; and oxides or oxy acid salts containing silicon.

5. A lithium ion conductive solid electrolyte according to claim 4, wherein the oxy acid salt containing silicon is lithium orthosilicate.

6. A process for synthesizing a lithium ion conductive solid electrolyte, which comprises melting a mixture of a plurality of sulfides including silicon sulfide and lithium sulfide and oxides or oxy acid salts containing at least one element selected from the group consisting of lithium, boron, phosphorus, aluminum, germanium and silicon, and then quenching the molten mixture, such mixture being free from halide ions.

7. A process for synthesizing a lithium ion conductive solid electrolyte, which comprises melting a mixture of at least one sulfide selected from the group consisting of silicon sulfide, boron sulfide, phosphorus sulfide, aluminum sulfide and germanium sulfide; lithium sulfide; and oxides or oxy acid salts containing silicon, and then quenching the molten mixture, such mixture being free from halide ions.

* * * * *